US012604870B2

(12) United States Patent
Ibata et al.

(10) Patent No.: US 12,604,870 B2
(45) Date of Patent: Apr. 21, 2026

(54) WAVE TRANSMISSION CONTROL DEVICE, UNDERWATER ORGANISM GUIDANCE DEVICE, AND WAVE TRANSMISSION CONTROL METHOD

(71) Applicant: Mitsubishi Electric Corporation, Tokyo (JP)

(72) Inventors: Koji Ibata, Tokyo (JP); Jin Hirano, Tokyo (JP); Tomoharu Awano, Tokyo (JP); Tai Tanaka, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 259 days.

(21) Appl. No.: 18/197,352

(22) Filed: May 15, 2023

(65) Prior Publication Data

US 2023/0276777 A1 Sep. 7, 2023

Related U.S. Application Data

(63) Continuation of application No. PCT/JP2021/000137, filed on Jan. 6, 2021.

(51) Int. Cl.
*A01K 61/90* (2017.01)
*A01M 29/18* (2011.01)

(52) U.S. Cl.
CPC ............. *A01K 61/90* (2017.01); *A01M 29/18* (2013.01)

(58) Field of Classification Search
CPC ....... A01M 29/16; A01M 29/18; A01K 79/02; A01K 61/90; Y02A 40/81
See application file for complete search history.

(56) References Cited

U.S. PATENT DOCUMENTS 4,922,468 A * 5/1990 Menezes ................. E02B 1/006
116/22 A
4,932,007 A * 6/1990 Suomala ............... A01M 29/16
43/17.1

(Continued)

FOREIGN PATENT DOCUMENTS

JP 49-41181 4/1974
JP 52-16385 2/1977

(Continued)

OTHER PUBLICATIONS

International Search Report (PCT/ISA/210) issued in PCT/JP2021/000137, dated Apr. 6, 2021.

(Continued)

*Primary Examiner* — Daniel L Murphy
*Assistant Examiner* — Amie M Ndure
(74) *Attorney, Agent, or Firm* — Birch, Stewart, Kolasch & Birch, LLP

(57) ABSTRACT

A wave transmission control device to control a transmitter to form a sound field in water includes processing circuitry to, when detection information is input from a sensor to detect an organism in water, determine a characteristic of the organism and a distribution state for every characteristic using the detection information, to acquire sound information based on the characteristic by referring to a database in which a characteristic of an organism and sound information are associated with each other, and to determine a sound output condition in such a manner that a distribution state changes from the distribution state which is set for the characteristic received before processing starts and to cause the transmitter to output a sound based on sound information using the output condition.

17 Claims, 8 Drawing Sheets

(56) References Cited

U.S. PATENT DOCUMENTS

| | | | | |
|---|---|---|---|---|
| 6,170,436 | B1 * | 1/2001 | Goodson | A01K 79/02 |
| | | | | 43/9.6 |
| 9,541,645 | B2 * | 1/2017 | Yamaguchi | G01S 15/96 |
| 2006/0268664 | A1 * | 11/2006 | Lewis | A01K 79/02 |
| | | | | 367/139 |
| 2007/0046498 | A1 * | 3/2007 | K.Y. Jung | G09F 19/22 |
| | | | | 340/853.1 |
| 2015/0156998 | A1 * | 6/2015 | Terry | A01K 61/00 |
| | | | | 43/4.5 |
| 2015/0234046 | A1 * | 8/2015 | Yamaguchi | G01S 7/6281 |
| | | | | 367/93 |
| 2020/0253170 | A1 * | 8/2020 | Simpkinson | A01K 63/02 |

FOREIGN PATENT DOCUMENTS

| | | |
|---|---|---|
| JP | 58-141739 A | 8/1983 |
| WO | WO 2019/229981 A1 | 12/2019 |

OTHER PUBLICATIONS

Written Opinion of the International Searching Authority (PCT/ISA/237) issued in PCT/JP2021/000137, dated Apr. 6, 2021.
Extended European Search Report for European Application No. 21917425.7, dated Jan. 24, 2024.
Chinese Office Action and Search Report for Chinese Application No. 202180088119.7, dated Nov. 19, 2025, with English translation.

* cited by examiner

| Identification Information | Characteristic Information | Distribution Information |
|---|---|---|
| $\overset{\frown}{11}$ | $\overset{\frown}{12}$ | $\overset{\frown}{13}$ |
|  |  |  |
| ⋮ | ⋮ | ⋮ |

FIG. 3
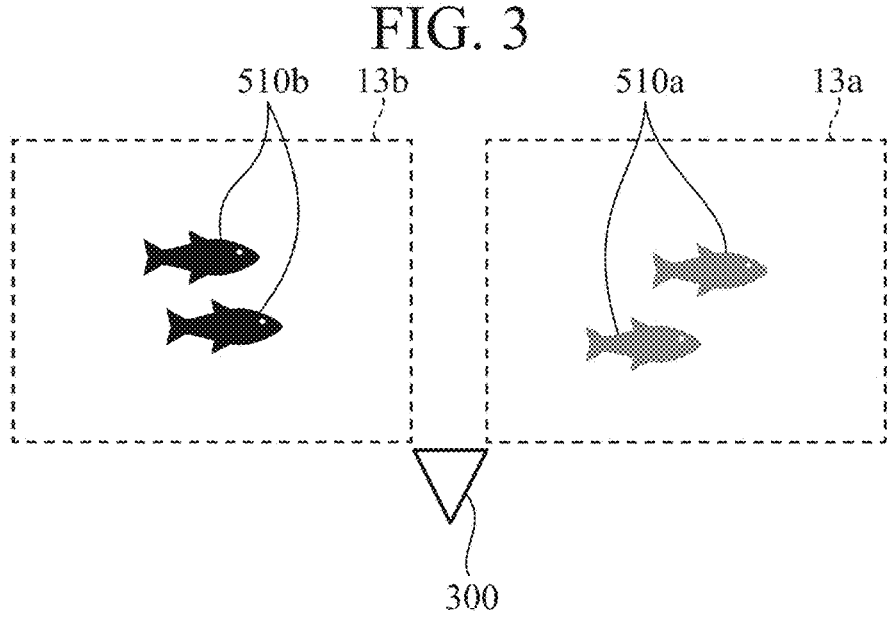
FIG. 4
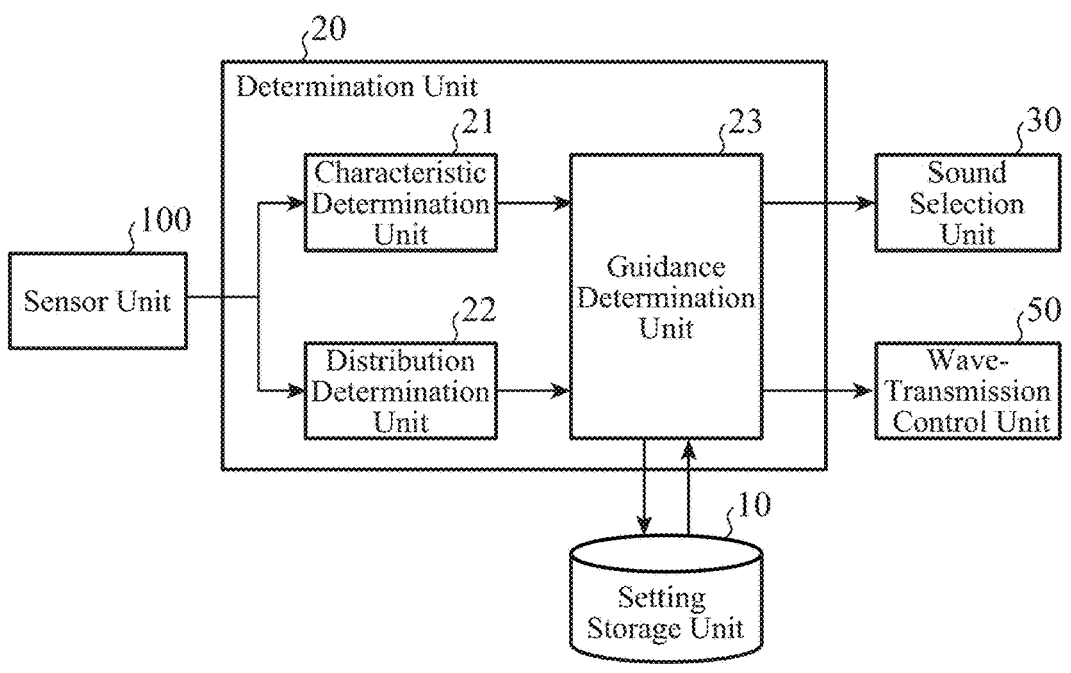
FIG. 5
| Identification Information | Characteristic Information | Sound Information |
|---|---|---|
| | | |
| | | |
| ⋮ | ⋮ | ⋮ |

312a          312b

300

WAVE TRANSMISSION CONTROL DEVICE, UNDERWATER ORGANISM GUIDANCE DEVICE, AND WAVE TRANSMISSION CONTROL METHOD

CROSS REFERENCE TO RELATED APPLICATIONS

This application is a Continuation of PCT International Application No. PCT/JP2021/000137 filed on Jan. 6, 2021, which is hereby expressly incorporated by reference into the present application.

TECHNICAL FIELD

The present disclosure relates to a wave transmission control device that outputs sound waves for moving organisms in water.

BACKGROUND ART

Conventionally, there is known a technique of moving organisms in water (hereinafter, referred to as "underwater organisms"). For example, Patent Literature 1 discloses a crustacean plankton catching method in which a group of crustacean plankton in the sea is moved. Specifically, when a group of crustacean plankton swimming in the sea is found by a fish detection device, sound wave generators are arranged in the sea so as to surround the group. When moving the group, the sound wave generators sequentially transmit a sound from the sound wave generator disposed below the group to the sound wave generator disposed above the group while detecting the position of the group, and move the group toward the sea surface. As a result, the crustacean plankton sequentially moves from the lower side to the upper side in the sea within the range surrounded by the sound wave generators.

CITATION LIST

Patent Literatures

Patent Literature 1: JP 52-016385 A

SUMMARY OF INVENTION

Technical Problem

However, in the conventional technique, there is a problem that, in a case where a plurality of underwater organisms with different characteristics are mixed in water, in addition to underwater organisms to be guided, other underwater organisms are unintendedly guided.

In a case where the crustacean plankton catching method described in Patent Literature 1 is applied to the case where a plurality of underwater organisms with different characteristics are mixed, it is not possible to sort and guide the underwater organisms, and the problem still cannot be solved.

The present disclosure has been made to solve the above problems, and an object of the present disclosure is to provide a wave transmission control device that sorts and guides underwater organisms based on each characteristic even in a case where a plurality of organisms with different characteristics are mixed in water.

Solution to Problem

A wave transmission control device according to the present disclosure performs control of a transmitter to form a sound field in water, the wave transmission control device including processing circuitry to, when detection information is input from a sensor to detect an organism in water, perform determination of a characteristic of the organism among a plurality of characteristics and a distribution state for each characteristic among the plurality of characteristics using the detection information, to acquire sound information based on the characteristic by referring to a database in which the plurality of characteristics and a plural pieces of sound information are respectively associated with each other, and to determine a sound output condition in such a manner that a distribution state changes from the distribution state to a set distribution state which is set for each of the plurality of characteristics received before processing starts and to cause the transmitter to output a sound based on the sound information using the sound output condition.

Advantageous Effects of Invention

According to the present disclosure, with the above configuration, it has the effect of providing a wave transmission control device that sorts and guides underwater organisms based on each characteristic.

BRIEF DESCRIPTION OF DRAWINGS

FIG. 3 is a concept diagram illustrating an example of a distribution state set in the wave transmission control device.

FIG. 4 is a diagram illustrating a configuration of a determination unit in the wave transmission control device.

FIG. 5 is a diagram illustrating an example of information stored in a database used in the underwater organism guidance device.

DESCRIPTION OF EMBODIMENTS

Hereinafter, an underwater organism guidance device and a wave transmission control device according to the present disclosure will be described with reference to the accompanying drawings.

In the present disclosure, organisms in water are referred to as "underwater organisms". The underwater organisms include all organisms in water. In addition, underwater includes a benthic region.

Furthermore, sound or sound waves are used in the present disclosure. The sound or sound waves include frequencies below the human audible range and frequencies above the human audible range (ultrasound waves).

First Embodiment

Figures 1, 2:
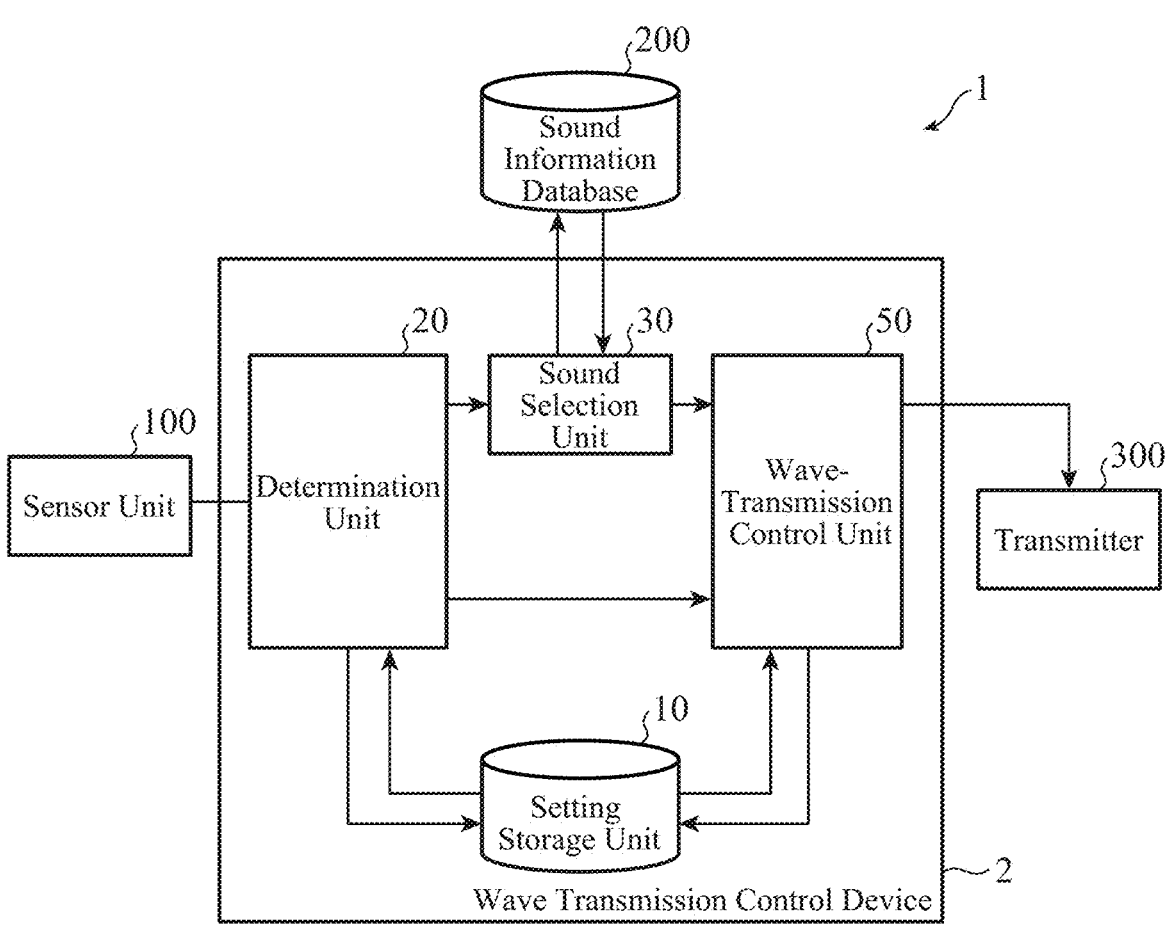
FIG. 1 is a diagram illustrating an example of a configuration of an underwater organism guidance device and a wave transmission control device according to a first embodiment.
FIG. 2 is a diagram illustrating an example of information stored in a setting storage unit.

FIG. 1 is a diagram illustrating an example of a configuration of an underwater organism guidance device and a wave transmission control device according to the present disclosure.

An underwater organism guidance device 1 guides underwater organisms in such a manner that a desired distribution is obtained for each characteristic of underwater organisms. In a case where a plurality of organisms with different characteristics are mixed in water, the underwater organism guidance device 1 guides at least one type of fish as a guidance target using a sound and sorts the fish from other types of fish.

For example, the underwater organism guidance device 1 is assumed to be used for guiding one type of fish in the direction of a fishing net when fishing is performed in the sea.

In addition, the underwater organism guidance device 1 is assumed to be used, for example, for guiding adult fish in the direction of a fishing net, keeping juvenile fish away from the fishing net, and preventing overfishing of the juvenile fish.

Furthermore, the underwater organism guidance device 1 is assumed to be used, for example, for feeding small fish with a body length less than a threshold after keeping large fish with a body length larger than or equal to the threshold away from a feeding position when feeding the fish in an aquaculture farm.

Moreover, the underwater organism guidance device 1 is assumed to be used, for example, for separately guiding specific types of fish in a water tank of an aquarium.

The underwater organism guidance device 1 illustrated in FIG. 1 includes a wave transmission control device 2, a sensor unit 100, a sound information database 200, and a transmitter 300.

The wave transmission control device 2, the sensor unit 100, the sound information database 200, and the transmitter 300 are communicably connected to each other.

The wave transmission control device 2 selects sound information with reference to the sound information database 200 by using detection information from the sensor unit 100 and distribution information indicating a distribution state being a guidance target, determines a sound output condition, and controls the transmitter 300 by using the output condition to form a sound field in water. Details of the wave transmission control device 2 and the sound information database 200 will be described later.

The sensor unit 100 detects underwater organisms and outputs detection information. The sensor unit 100 detects underwater organisms using, for example, a sound wave, a radio wave, or light, and outputs detection information. Alternatively, the sensor unit 100 detects underwater organisms using, for example, an image captured by a camera, and outputs detection information. Alternatively, the sensor unit 100 may detect underwater organisms using two or more of a sound wave, a radio wave, light, and an image captured by a camera, and output the detection information.

The transmitter 300 is provided in water. The transmitter 300 is attached to the hull of a ship, for example. Alternatively, the transmitter 300 is attached to a structure provided in, for example, the ocean, a river, or a water tank. The structure includes a structure floating on the water in addition to a structure fixed to a shore or a benthic region.

The transmitter 300 outputs directional sound waves into water to form a sound field in the water. The transmitter 300 is, for example, a speaker, and is specifically an underwater speaker, a superdirectional speaker, an ultrasonic speaker, or an ultrasonic sensor. In addition, the transmitter 300 may be a speaker array including a plurality of any of the above and arranged in an array. That is, the transmitter includes, for example, one or a plurality of speakers.

The transmitter 300 may output directional sound waves in a plurality of different directions in water.

Further, the transmitter 300 may include a drive unit (not illustrated) that changes a direction in which the transmitter 300 transmits waves in accordance with an output direction included in the output condition determined by a wave-transmission control unit 50.

In this case, when receiving a control signal from the wave-transmission control unit 50, the drive unit mechanically changes the direction of the transmitter 300 in accordance with the output direction indicated by the control signal.

As a result, in the water where the transmitter 300 can transmit waves, the wave-transmission control unit 50 can further cause the transmitter 300 to form a sound field in any direction in water and in any range in water.

In a case where the plurality of transmitters 300 are provided and the plurality of transmitters 300 are installed at different positions, the wave-transmission control unit 50 controls the amplitude and phase of a sound output from each of the transmitters 300. As a result, in the water where the transmitter 300 can transmit waves, it is possible to cause the transmitter 300 to form a sound field in any direction in water and in any range in water.

Details of the wave transmission control device 2 and the sound information database 200 will be described.

The wave transmission control device 2 illustrated in FIG. 1 includes a setting storage unit 10, a determination unit 20, a sound selection unit 30, and the wave-transmission control unit 50.

In addition, the wave transmission control device 2 includes a control unit (not illustrated). The control unit issues a command to start, continue, and end the entire processing of the wave transmission control device 2 on the basis of information acquired from the inside and the outside of the wave transmission control device 2. For example, the control unit determines whether or not to end wave transmission control each time the wave transmission control device 2 executes control on the transmitter 300. When determining to end the wave transmission control, the control unit ends the processing performed by the wave transmission control device 2. When determining not to end the wave transmission control, the control unit issues a command to repeat the processing related to the wave transmission control from the beginning. When repeating the processing related to the wave transmission control, the control unit may issue a command to omit the processing performed by the sound selection unit 30 in the second and subsequent processing.

The setting storage unit 10 stores a distribution state for each characteristic set in advance. Specifically, the setting storage unit 10 stores in advance information indicating characteristics of an underwater organism and information indicating a distribution state of the underwater organism in water before the wave transmission control device 2 starts wave transmission control processing on the transmitter 300.

The information indicating the characteristics of the underwater organism and the information indicating the distribution state of the underwater organism in water are, for example, information set by a user before the wave transmission control device 2 starts the control processing. In other words, the information stored in the setting storage unit 10 indicates the distribution state in water of each underwater organism (guidance target) that the user desires to guide. It is only required that this information is received and stored at the latest until immediately before the wave transmission control device 2 starts control.

Furthermore, information set in the setting storage unit 10 will be described.

FIG. 2 is a diagram illustrating an example of information stored in the setting storage unit 10.

The setting storage unit 10 stores identification information 11, characteristic information 12, and distribution information 13 in association with one another. The setting storage unit 10 may store a plurality of sets of the identification information 11, the characteristic information 12, and the distribution information 13.

The identification information 11 in the setting storage unit 10 is information for identifying a combination of the characteristic information 12 and the distribution information 13 in a case where a plurality of sets of the characteristic information 12 and the distribution information 13 are stored in the setting storage unit 10. The identification information 11 is, for example, alphanumeric characters that do not overlap in combinations of the characteristic information 12 and the distribution information 13.

The characteristic information 12 in the setting storage unit 10 indicates characteristics of the underwater organism set in advance. The characteristic information 12 is, for example, at least one of information indicating the type of the underwater organism or information indicating the size of the underwater organism.

The distribution information 13 indicates the distribution state of the underwater organism in water. The distribution information 13 indicates, for example, at least one of a direction of a region in water, a distance to the region, or a position of the region based on an installation position of the transmitter 300. Furthermore, the distribution information 13 may include the area of the region.

In the following description, the identification information 11 set in the setting storage unit 10 may be referred to as "set identification information 11", and similarly, characteristic information 12 may be referred to as "set characteristic information 12", and the distribution information 13 may be referred to as "set distribution information

13". In addition, the distribution state indicated by the set distribution information 13 may be referred to as "set distribution state".

In the following description, a case where the direction of a region in water based on the installation position of the transmitter 300 is used will be described as a representative, but the present disclosure is not limited to this case.

Note that, in a case where only one set of information is set in the setting storage unit 10, the set identification information 11 is not essential.

FIG. 3 is a concept diagram illustrating an example of a distribution state set in the wave transmission control device 2.

For example, as illustrated in FIG. 3, the setting storage unit 10 stores set distribution information 13 indicating a distribution state where fish 510*a* are present in a region 13*a* on the right front of the transmitter, and stores set distribution information 13 indicating a distribution state where fish 510*b* are present in a region 13*b* on the left front of the transmitter. Here, the fish 510*a* and the fish 510*b* are different types of fish, and have different audible sounds from each other, or have different preference sounds and repellent sounds from each other.

When detection information is input from the sensor unit 100 that detects an underwater organism, the determination unit 20 determines the characteristics of the underwater organism and the distribution state of the underwater organism for each of the characteristics using the detection information. The determination unit 20 outputs the characteristic information indicating the characteristic of the underwater organism and the distribution information indicating the distribution state of the organism for each characteristic.

FIG. 4 is a diagram illustrating a configuration of the determination unit 20 in the wave transmission control device 2.

FIG. 4 illustrates the configuration of the determination unit 20 and a relationship with peripheral components.

The determination unit 20 illustrated in FIG. 4 includes a characteristic determination unit 21, a distribution determination unit 22, and a guidance determination unit 23.

The characteristic determination unit 21 determines the characteristic of the underwater organism detected by the sensor unit 100 using the detection information received from the sensor unit 100. The characteristic of the underwater organism is, for example, the type, size, or degree of growth of the underwater organism. The technique of determining the type, size, or degree of growth of the underwater organism using the detection information from the sensor unit 100 can be implemented using a known technique. Therefore, detailed description is omitted here.

The characteristic determination unit 21 outputs characteristic information indicating the determined characteristic. Hereinafter, the characteristic information output by the characteristic determination unit 21 may be referred to as "determined characteristic information".

The distribution determination unit 22 determines the distribution state of the underwater organism detected by the sensor unit 100 using the detection information received from the sensor unit 100. The distribution determination unit 22 outputs distribution information indicating the determined distribution state. The distribution information determined by the distribution determination unit 22 indicates a region where the underwater organism is currently present. Specifically, the distribution information determined by the distribution determination unit 22 indicates any one of the direction of the region in water, the distance to the region, and the position of the region based on the installation position of the transmitter 300. In addition thereto, information indicating the area of the region may be included. Hereinafter, the distribution information output by the distribution determination unit 22 may be referred to as "determined distribution information".

The guidance determination unit 23 determines whether to execute wave transmission control for guiding the underwater organism.

Specifically, the guidance determination unit 23 refers to the setting storage unit 10 and determines whether or not the determined characteristic information received from the characteristic determination unit 21 matches the set characteristic information 12. As a result, when determining that they match, the guidance determination unit 23 can determine that the underwater organism detected by the sensor unit 100 is the underwater organism to be guided.

In addition, the guidance determination unit 23 refers to the setting storage unit 10 and determines whether or not the determined distribution information received from the distribution determination unit 22 matches the set distribution information 13. As a result, w % ben determining that they match, the guidance determination unit 23 can determine that the wave transmission control is executed to guide the underwater organism.

When determining that the wave transmission control is executed, the guidance determination unit 23 outputs the determined characteristic information and the determined distribution information.

Note that when comparing the determined distribution information with the set distribution information 13 and determining that the difference is equal to or less than a threshold, the guidance determination unit 23 may determine that the wave transmission control is not executed, and when determining that the difference exceeds the threshold, the guidance determination unit may determine that the wave transmission control is executed.

The sound selection unit 30 refers to the sound information database 200 in which the characteristic of the underwater organism and the sound information are associated, and acquires sound information based on the characteristic determined by the determination unit 20. Specifically, the sound selection unit 30 refers to the sound information database 200 to search for characteristic information matching the determined characteristic information, and selects and acquires sound information associated with the searched characteristic information. The sound selection unit 30 outputs the acquired sound information.

Here, the sound information database 200 will be described.

FIG. 5 is a diagram illustrating an example of information stored in the sound information database 200 used in the underwater organism guidance device 1.

In FIG. 5, the sound information database 200 stores identification information 201, characteristic information 202, and sound information 203 in association with one another.

The identification information 201 in the sound information database 200 is information for identifying a combination of the characteristic information 202 and the sound information 203. The identification information 201 includes, for example, alphabetical character strings or the like that are different for each pieces of set information.

The characteristic information 202 in the sound information database 200 indicates characteristics of the underwater organism. The characteristic information 202 is, for example, type information indicating the type of the underwater organism or size information indicating the size of the underwater organism. Specifically, the type information is fish name information such as "sardine" or "sea bream", and the size information is information indicating a body length such as "10 cm", or "adult fish" or "juvenile fish" based on the body length. In addition, the characteristic information 202 may be a value indicating the degree of growth of the underwater organism. Furthermore, the characteristic information 202 may be information indicating the combination of the type information and the size information.

The sound information 203 in the sound information database 200 indicates an audible sound based on the auditory characteristic of each underwater organism. The sound information 203 indicates, for example, a frequency band and a wave transmission pattern in which the intensity of a sound changes with time.

Here, the auditory sense of underwater organisms will be described by taking fish as an example. The fish have auditory characteristics, and for example, the audible range varies depending on the type and size of the fish. That is, there is an audible sound corresponding to the type and size of fish.

In the audible range of fish, there are a preference sound and a repellent sound corresponding to the breeding environment of fish.

For example, in a natural environment such as the sea, a predation sound generated at the time of preying on bait is a preference sound, whereas a barking sound generated against an action of a natural enemy is a repellent sound.

In addition, for example, in a breeding environment such as an aquaculture farm, a feeding sound generated when a feeder operates is a preference sound, whereas a sound that fish has intentionally trained to avoid is a repellent sound. As a method of intentionally training fish to avoid, there is a method of training the fish by repeating a series of processes of vibrating water immediately after generating a certain sound and causing the fish to move away from the current position.

Information indicating these preference sound and repellent sound is set as the sound information 203 in the sound information database 200.

In a case where the sound information 203 in the sound information database 200 includes both the preference sound and the repellent sound, sound type information capable of identifying that the sound is the preference sound or the repellent sound is further given to each combination of the characteristic information 202 and the sound information 203. When the wave-transmission control unit 50 determines a sound output condition, the sound type information is used, for example, in processing of determining a direction in which the underwater organism is to be guided as the output direction in a case where the sound type information indicates the preference sound, and in processing of determining a direction opposite to the direction in which the underwater organism is to be guided as the output direction in a case where the sound type information indicates the repellent sound.

In addition, in a case where the sound information 203 includes both the preference sound and the repellent sound, the preference sound and the repellent sound can be used for processing in which both sounds are used in combination. For example, in a case where it is desired to catch only a specific fish species A, the preference sound of the fish species A to be caught is selected, the preference sound of the fish species A is output to a desired position, and the fish species A is guided to a catch position. On the other hand, for the underwater organisms other than the fish species A, the repellent sound of the underwater organisms other than the fish species A is output to the position where the preference sound of the fish species A is output to move the underwater organisms other than the fish species A away from the catch position.

The sound information 203 in the sound information database 200 may be only the preference sound or only the repellent sound.

Note that, in FIG. 1, the sound information database 200 is configured to be included in the underwater organism guidance device 1 and is provided outside the wave transmission control device 2, but is not limited thereto. The sound information database 200 may be, for example, a database outside the underwater organism guidance device 1, and the sound information database 200 may be provided inside the wave transmission control device 2, for example.

Furthermore, although the sound information database 200 is illustrated in the present disclosure, for example, the sound information database 200 may be provided in a cloud or the like that can be referred to by the underwater organism guidance device 1, or may be provided in a portable storage medium such as an SD card.

That is, the sound information database is only required to be communicably connected to the wave transmission control device 2.

The wave-transmission control unit 50 illustrated in FIG. 1 determines a sound output condition so as to guide an underwater organism to be guided to a region to be guided, and executes control to cause the transmitter 300 to output a sound using the output condition.

Specifically, the wave-transmission control unit 50 determines a sound output condition so as to obtain a distribution state (a distribution state indicated by set distribution information) for each characteristic set in advance in the setting storage unit 10, and causes the transmitter 300 to output a sound based on the sound information acquired by the sound selection unit 30 in such a manner that the determined output condition is satisfied.

Furthermore, the wave-transmission control unit 50 repeats processing of determining a sound output condition and causing the transmitter 300 to output a sound based on the sound information acquired by the sound selection unit 30 in such a manner that the determined output condition is satisfied until the distribution state changes from the distribution state determined by the determination unit 20 to the distribution state indicated by the set distribution information.

Figure 6:
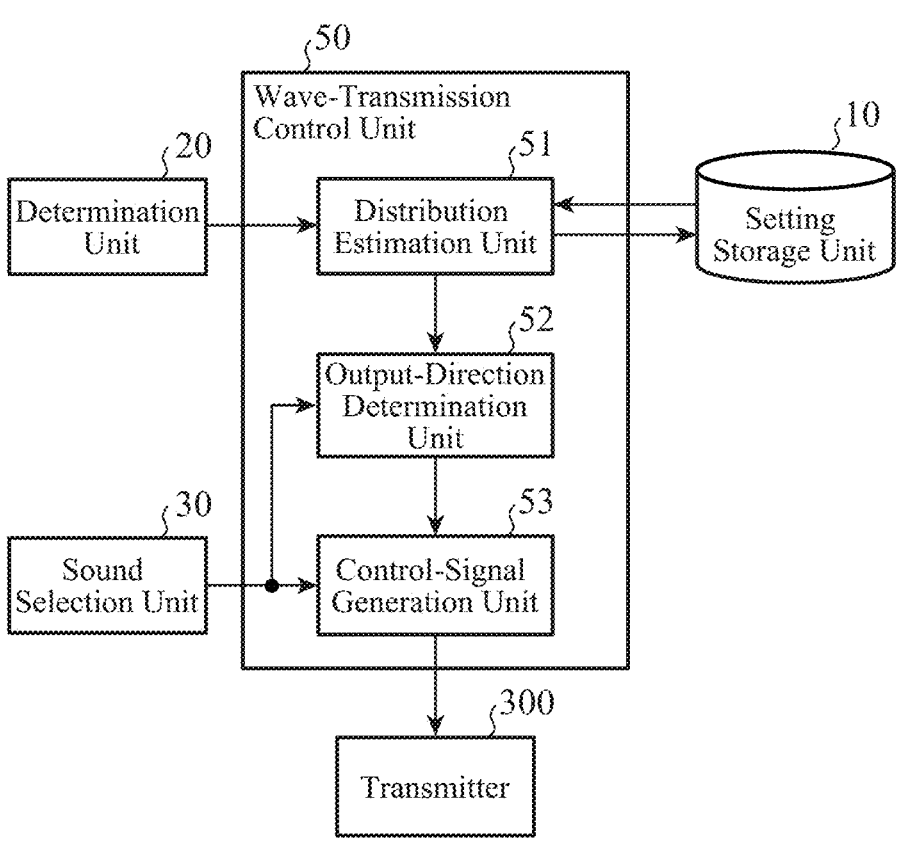
FIG. 6 is a diagram illustrating a configuration of a wave-transmission control unit in the wave transmission control device.

FIG. 6 is a diagram illustrating a configuration of the wave-transmission control unit 50 in the wave transmission control device 2.

FIG. 6 illustrates the configuration of the wave-transmission control unit 50 and a relationship with peripheral components.

The wave-transmission control unit 50 illustrated in FIG. 6 includes a distribution estimation unit 51, an output-direction determination unit 52, and a control-signal generation unit 53. In the present disclosure, the output-direction determination unit 52 is an example of an output-condition determination unit that determines a sound output condition.

The distribution estimation unit 51 compares the distribution state determined by the determination unit 20 with the distribution state indicated by the set distribution information, and estimates a distribution state where the distribution state determined by the determination unit 20 becomes closer to the distribution state indicated by the set distribution information.

Specifically, when receiving the determined characteristic information and the determined distribution information from the determination unit 20, the distribution estimation unit 51 compares the determined distribution information with the set distribution information for each characteristic stored in the setting storage unit 10. The distribution estimation unit 51 estimates a distribution state where the distribution state indicated by the determined distribution information becomes closer to the distribution state indicated by the set distribution information.

The method of estimating the distribution state where the current distribution state is brought close to the distribution state for each characteristic set in advance can be implemented by a known technique such as artificial intelligence (AI). In addition, for example, it can be implemented by changing the distance between the coordinates of two different distributions so as to gradually decrease. Therefore, a more detailed description will be omitted.

The distribution estimation unit 51 outputs distribution information indicating the estimated distribution state. Specifically, the distribution information output from the distribution estimation unit 51 indicates any one of the direction of the region in water, the distance to the region, and the position of the region based on the installation position of the transmitter 300. In addition thereto, information indicating the area of the region may be included. Hereinafter, the distribution information output by the distribution estimation unit 51 may be referred to as "estimated distribution information".

The output-direction determination unit 52 determines a sound output direction in such a manner that the distribution state estimated by the distribution estimation unit 51 is obtained.

Specifically, for example, in a case where the preference sound is output, the output-direction determination unit 52 determines the direction indicated by the estimated distribution information as the output direction. Furthermore, for example, in a case where the repellent sound is output, the output-direction determination unit 52 determines the direction opposite to the direction indicated by the estimated distribution information as the output direction with respect to the region indicated by the determined distribution information.

The output-direction determination unit 52 outputs output direction information indicating the determined output direction.

Note that, in a case where the distribution information indicates a direction, the output-direction determination unit 52 determines only the sound output direction, but the output-direction determination unit 52 can be changed to an output-condition determination unit corresponding to the distribution state indicated by the distribution information.

For example, in a case where the distribution information indicates a distance, the output-direction determination unit 52 may be changed to an output-intensity determination unit, and the output-intensity determination unit determines the intensity of the sound to be output.

Furthermore, for example, in a case where the distribution information indicates a position, the output-direction determination unit 52 may be changed to an output-direction intensity determination unit, and the output-direction intensity determination unit determines the sound output direction and the intensity of the sound to be output.

That is, the output-condition determination unit may be any of the output-direction determination unit 52, the output-intensity determination unit, and the output-direction intensity determination unit.

Furthermore, for example, in a case where the area is included in the distribution information, each of the output-direction determination unit 52, the output-intensity determination unit, and the output-direction intensity determination unit may determine the degree of directivity at the time of outputting a sound.

Figure 7:
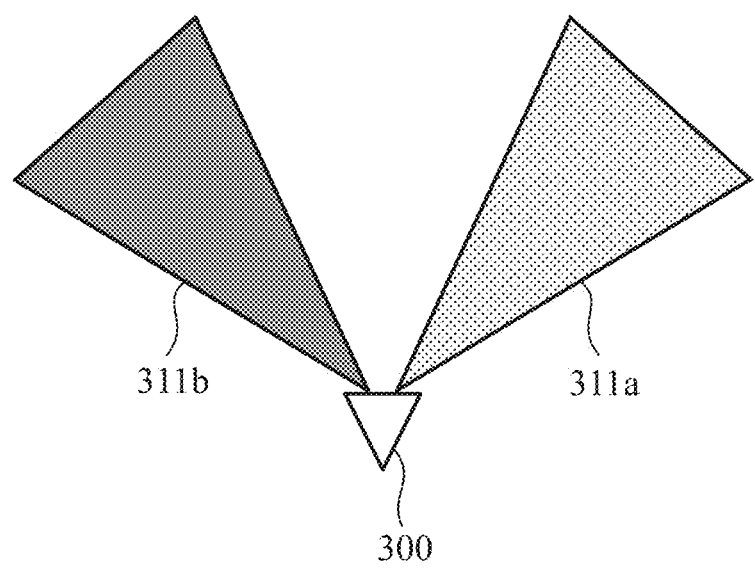
FIG. 7 is a diagram illustrating a first concept of a state where a transmitter controlled by the wave transmission control device transmits waves.

FIG. 7 is a diagram illustrating a first concept of a state where the transmitter 300 controlled by the wave transmission control device 2 transmits waves.

Figure 8:
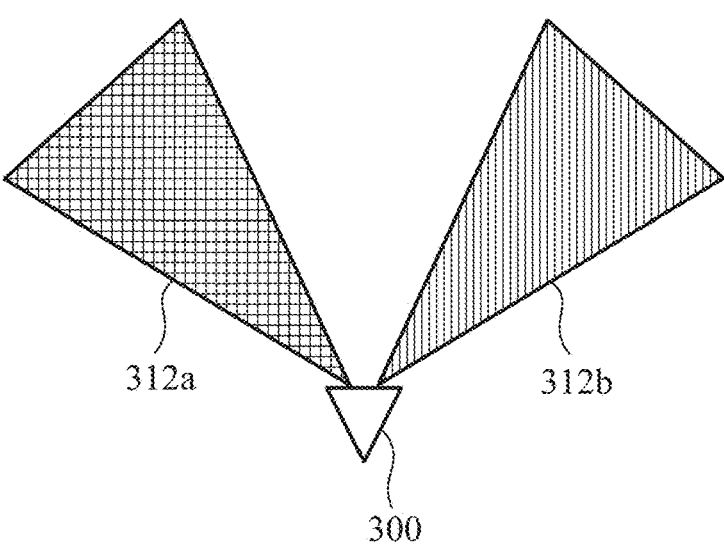
FIG. 8 is a diagram illustrating a second concept of the state where the transmitter controlled by the wave transmission control device transmits waves.

FIG. 8 is a diagram illustrating a second concept of a state where the transmitter 300 controlled by the wave transmission control device 2 transmits waves.

The output-direction determination unit 52 in the wave-transmission control unit 50 determines an output direction as follows, for example.

In a case where the sound information acquired by the sound selection unit 30 is a preference sound 311*a* of the fish 510*a* and a preference sound 311*b* of the fish 510*b*, the output-direction determination unit 52 determines that the sound to be output is the preference sound on the basis of, for example, the sound type information received from the sound selection unit 30. Then, as illustrated in FIG. 7, the output-direction determination unit 52 determines the output direction of the preference sound 311*a* as a direction of the region 13*a*, and determines the output direction of the preference sound 311*b* as a direction of the region 13*b*.

On the other hand, in a case where the sound information acquired by the sound selection unit 30 is a repellent sound 312*a* of the fish 510*a* and a repellent sound 312*b* of the fish 510*b*, the output-direction determination unit 52 determines that the sound to be output is the repellent sound on the basis of, for example, the sound type information received from the sound selection unit 30. Then, as illustrated in FIG. 8, the output-direction determination unit 52 determines the output direction of the repellent sound 312*a* as the direction of the region 13*b*, and determines the output direction of the repellent sound 312*b* as the direction of the region 13*a*.

Using the output direction information received from the output-direction determination unit 52 and the sound information received from the sound selection unit 30, the control-signal generation unit 53 generates a control signal for causing the transmitter 300 to output a sound based on the sound information acquired by the sound selection unit 30 in the output direction determined by the output-direction determination unit 52. The control-signal generation unit 53 outputs the generated control signal.

Figure 9A:
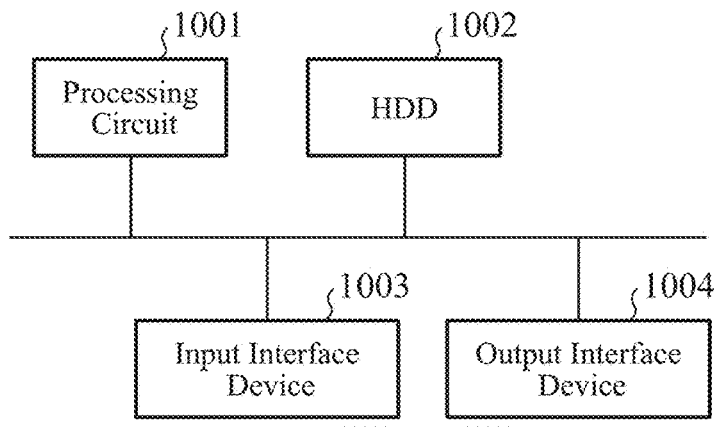
FIGS. 9A and 9B are diagrams illustrating a hardware configuration of the underwater organism guidance device and the wave transmission control device according to the first embodiment.
Figure 9B:
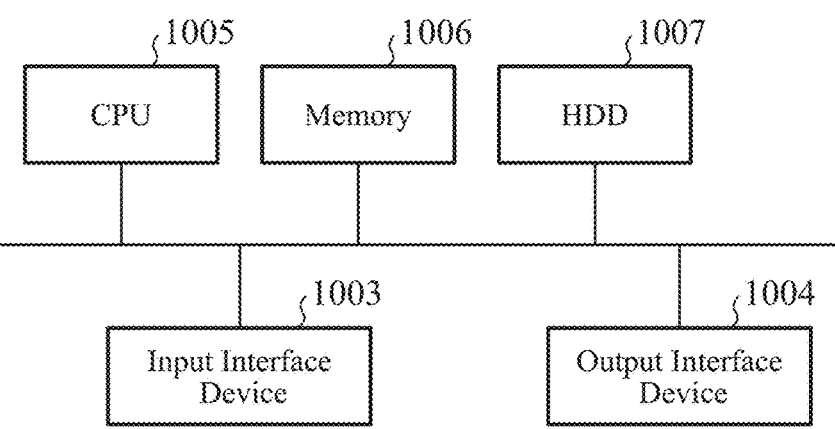

FIGS. 9A and 9B are diagrams illustrating a hardware configuration of the wave transmission control device 2 according to the first embodiment.

In the first embodiment, the functions of the determination unit 20, the sound selection unit 30, and the wave-transmission control unit 50 are implemented by a processing circuit 1001. That is, the wave transmission control device 2 includes the processing circuit 1001 for executing wave transmission control to select and acquire the sound information 203 corresponding to a characteristic of the underwater organism, causing the transmitter 300 to output a sound into water using the acquired sound information 203, and forming a sound field in water.

The processing circuit 1001 may be dedicated hardware as illustrated in FIG. 9A, or may be a central processing unit (CPU) 1005 that executes a program stored in a memory 1006 as illustrated in FIG. 9B.

In a case where the processing circuit 1001 is dedicated hardware, the processing circuit 1001 corresponds to, for example, a single circuit, a composite circuit, a programmed processor, a parallel programmed processor, an application specific integrated circuit (ASIC), a field-programmable gate array (FPGA), or a combination thereof.

In a case where the processing circuit 1001 is the CPU 1005, the functions of the determination unit 20, the sound selection unit 30, and the wave-transmission control unit 50 are implemented by software, firmware, or a combination of software and firmware. That is, the functions of the determination unit 20, the sound selection unit 30, and the wave-transmission control unit 50 are implemented by a processing circuit such as the CPU 1005 that executes a program stored in a hard disk drive (HDD) 1002, a memory 1006, or the like, or a system large-scale integration (LSI). It can also be said that the program stored in the HDD 1002, the memory 1006, or the like causes a computer to execute procedures and methods of processing performed by the determination unit 20, the sound selection unit 30, and the wave-transmission control unit 50. Here, the memory 1006 corresponds to, for example, a nonvolatile or volatile semiconductor memory such as a random access memory (RAM), a read only memory (ROM), a flash memory, an erasable programmable read only memory (EPROM), or an electrically erasable programmable read only memory (EE-PROM), a magnetic disk, a flexible disk, an optical disk, a compact disk, a mini disk, a digital versatile disc (DVD), or the like.

Note that some of the functions of the determination unit 20, the sound selection unit 30, and the wave-transmission control unit 50 may be implemented by dedicated hardware, whereas some thereof may be implemented by software or firmware. For example, the function of the sound selection unit 30 can be implemented by the processing circuit 1001 as dedicated hardware, and the functions of the determination unit 20, the sound selection unit 30, and the wave-transmission control unit 50 can be implemented by the CPU 1005 reading and executing a program stored in the memory 1006.

In addition, the wave transmission control device 2 includes an input interface device 1003 and an output interface device 1004 that communicate with the sensor unit 100, the sound information database 200, the transmitter 300, or the like.

Next, processing of the wave transmission control device 2 according to the first embodiment will be described.

Figure 10:
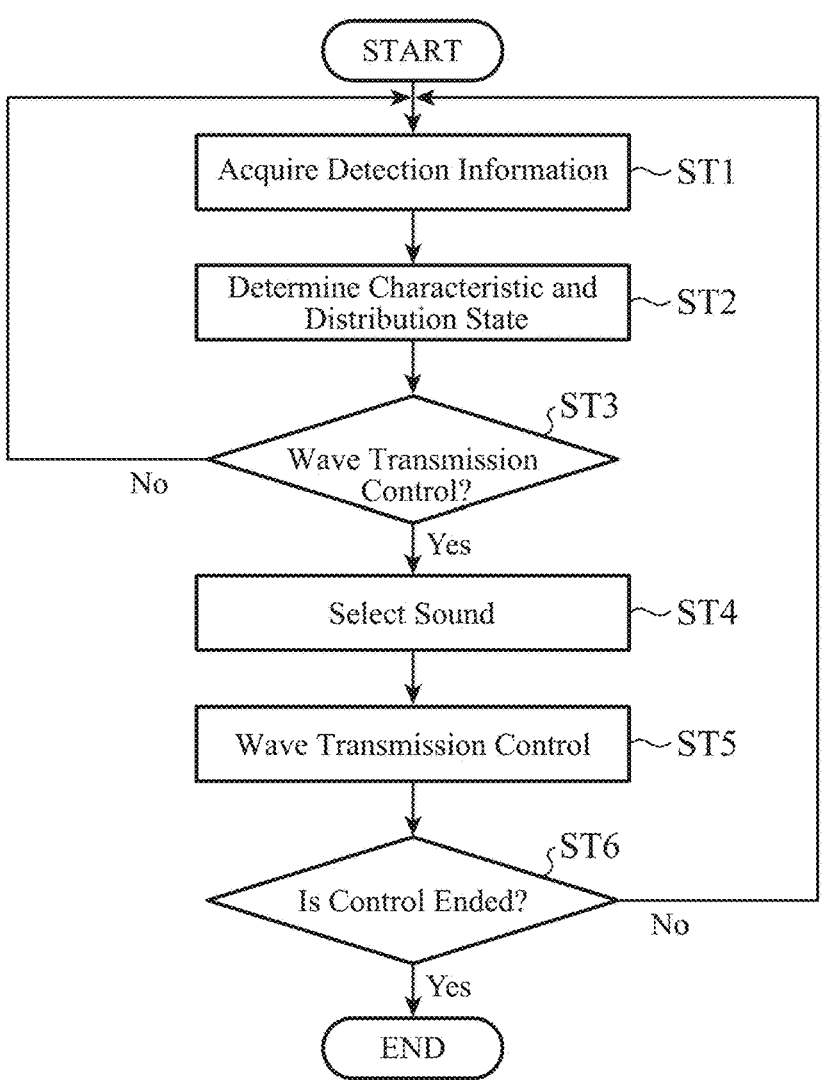
FIG. 10 is a flowchart illustrating processing performed by the wave transmission control device.

FIG. 10 is a flowchart illustrating processing of the wave transmission control device 2.

Figure 11:
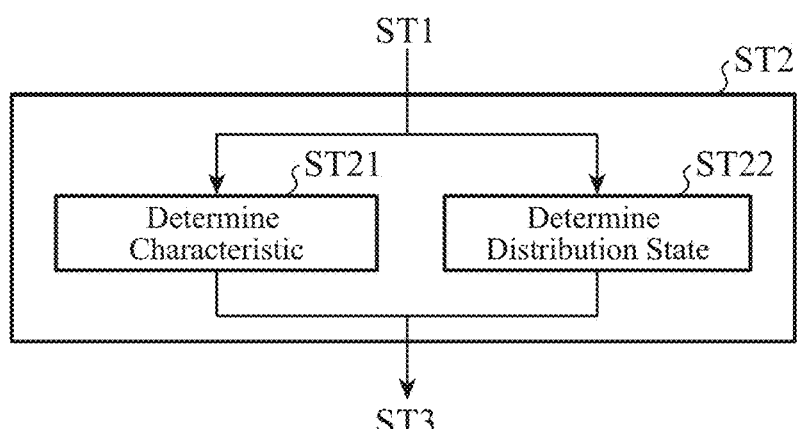
FIG. 11 is a flowchart illustrating processing performed by the determination unit.

FIG. 11 is a flowchart illustrating processing of the determination unit 20.

Figure 12:
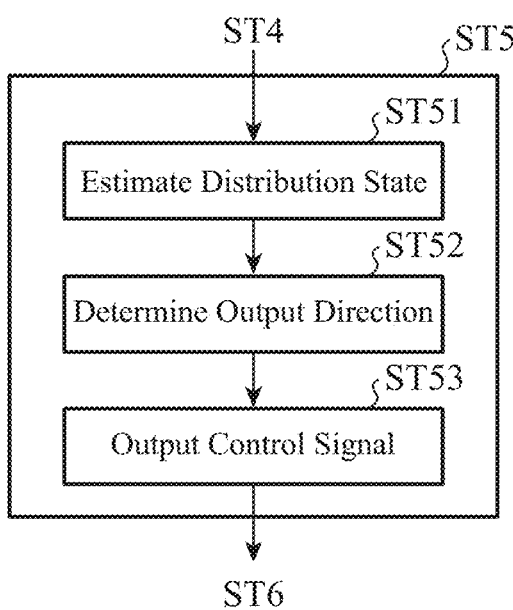
FIG. 12 is a flowchart illustrating processing performed by the wave-transmission control unit.

FIG. 12 is a flowchart illustrating processing of the wave-transmission control unit 50.

For example, when receiving a start command from a user and detection information from the sensor unit 100, the wave transmission control device 2 starts processing (start).

When acquiring the detection information (step ST1 in FIG. 10), the determination unit 20 determines characteristics of an underwater organism and a distribution state of the underwater organism in water (step ST2 in FIG. 10).

Specifically, in step ST2, for example, as illustrated in FIG. 11, the characteristic determination unit 21 in the determination unit 20 determines the characteristic of the underwater organism using the detection information, and outputs determined characteristic information indicating the determined characteristic (step ST21 in FIG. 11). In addition, the distribution determination unit 22 in the determination unit 20 determines the distribution state of the underwater organism using the detection information, and outputs determined distribution information indicating the determined distribution state (step ST22 in FIG. 11).

Using the determined characteristic information and the determined distribution information output from the determination unit 20, the guidance determination unit 23 in the determination unit 20 refers to the setting storage unit 10 and determines whether or not to execute wave transmission control for guiding the underwater organism (step ST3 in FIG. 10). If it is determined that the wave transmission control is not executed (step ST3 "No" in FIG. 10), the processing returns to step ST1.

If the guidance determination unit 23 determines that the wave transmission control is executed (step ST3 "Yes" in FIG. 10), the guidance determination unit outputs the determined characteristic information and the determined distribution information.

When acquiring the determined characteristic information, the sound selection unit 30 refers to the sound information database 200 to search for characteristic information matching the determined characteristic information, and selects and acquires sound information associated with the searched characteristic information (step ST4 in FIG. 10). The sound selection unit 30 outputs the acquired sound information.

When receiving the sound information from the sound selection unit 30, the wave-transmission control unit 50 determines a sound output direction so as to obtain a distribution state for each characteristic set in advance, and controls the transmitter 300 to output a sound based on the sound information acquired by the sound selection unit 30 in the determined output direction (step ST5 in FIG. 10).

Specifically, in step ST5, for example, as illustrated in FIG. 12, the distribution estimation unit 51 in the wave-transmission control unit 50 compares the determined distribution information determined by the determination unit 20 with the set distribution information for each characteristic set in advance, and estimates a distribution state where the distribution state determined by the determination unit 20 becomes closer to the distribution state for each characteristic set in advance (step ST51 in FIG. 12).

Next, the output-direction determination unit 52 in the wave-transmission control unit 50 determines the sound output direction in such a manner that the distribution state estimated by the distribution estimation unit 51 is obtained (step ST52 in FIG. 12). Note that, in a case where both the preference sound and the repellent sound are included in the sound information database 200, in step ST52, the output-direction determination unit 52 adjusts the sound output direction based on the type of the sound information acquired by the sound selection unit 30 and then determines the sound output direction.

The output-direction determination unit 52 outputs output direction information indicating the determined output direction.

Next, using the output direction information received from the output-direction determination unit 52 and the sound information received from the sound selection unit 30, the control-signal generation unit 53 generates a control signal for causing the transmitter 300 to output a sound based on the sound information acquired by the sound selection unit 30 in the output direction determined by the output-direction determination unit 52. The control-signal generation unit 53 outputs the generated control signal (step ST53 in FIG. 12).

A control unit (not illustrated) in the wave transmission control device 2 determines whether to end the wave transmission control. Specifically, for example, the control unit uses the determined distribution information, the set distribution information 13, and the estimated distribution information to determine whether or not the current distribution state matches the distribution state indicated by the set distribution information 13.

The control unit determines whether or not to end the wave transmission control on the basis of the determination result, and ends the processing (end in FIG. 10) when determining that the distribution states match and the wave transmission control is to be ended (step ST6 "Yes" in FIG. 10). If the control unit determines that the distribution states do not match and the wave transmission control is not ended (step ST6 "No" in FIG. 10), the control unit issues a command to repeat from the processing of step ST1.

Note that, for example, the control unit may determine that the wave transmission control is ended in a case where the difference between the current distribution state and the distribution state indicated by the set distribution information 13 is equal to or less than a threshold.

In the above processing performed by the control unit, the current distribution state may be estimated using the estimated distribution information, or the determined distribution information may be obtained from newly acquired detection information.

Next, a concept of guiding underwater organisms using the underwater organism guidance device and the wave transmission control device according to the first embodiment will be described.

Figure 13:
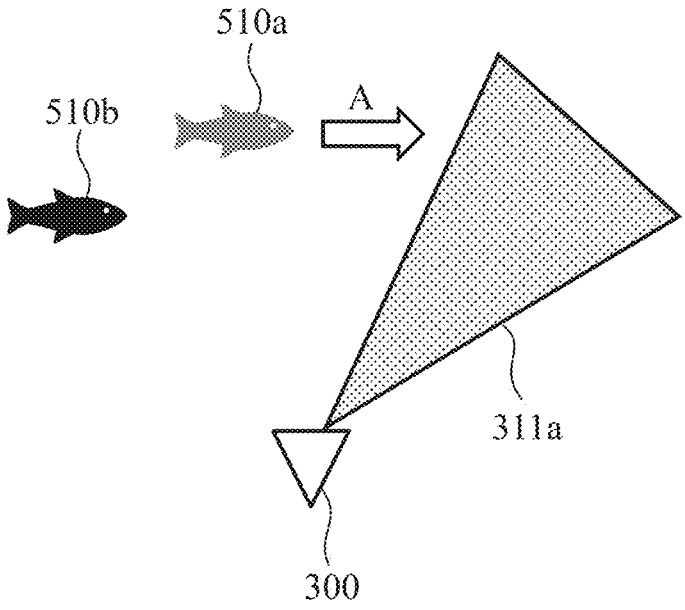
FIG. 13 is a first concept diagram illustrating a state where underwater organisms are guided by the transmitter controlled by the wave transmission control device transmitting waves.

FIG. 13 is a first concept diagram illustrating a state where underwater organisms are guided by the transmitter 300 controlled by the wave transmission control device 2 transmitting waves.

It is assumed that the setting storage unit 10 stores the set distribution information 13 indicating a distribution state where the fish 510*a* gather in the region 13*a* illustrated in FIG. 3 on the right front of the transmitter 300.

By the transmitter outputting the preference sound 311*a* to the right front region of the transmitter 300 on the basis of the control signal received from the wave-transmission control unit 50, a sound field where the fish 510*a* are guided is formed in the right front region of the transmitter 300.

Since the sound field of the preference sound 311*a* for the fish 510*a* is formed in the region 13*a*, the fish 510*a* are guided and moved toward the sound field of the preference sound 311*a* as indicated by an arrow A.

On the other hand, the preference sound 311*a* is different from the audible sound of the fish 510*b* or from the preference sound of the fish 510*b*. Therefore, the fish 510*b* do not move.

Figure 14:
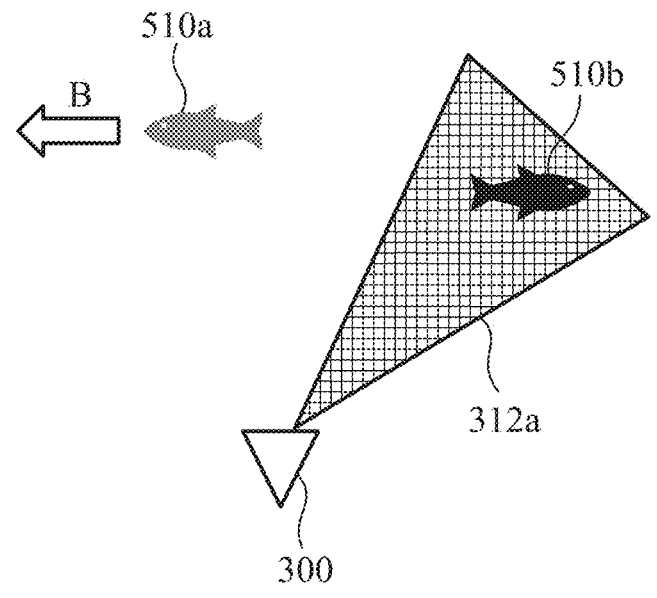
FIG. 14 is a second concept diagram illustrating the state where underwater organisms are guided by the transmitter controlled by the wave transmission control device transmitting waves.

FIG. 14 is a second concept diagram illustrating the state where underwater organisms are guided by the transmitter 300 controlled by the wave transmission control device 2 transmitting waves.

It is assumed that the setting storage unit 10 stores the set distribution information 13 indicating a distribution state where the fish 510*a* gather in the region 13*b* illustrated in FIG. 3 on the left front of the transmitter 300.

By the transmitter 300 outputting the repellent sound 312*a* to the right front region of the transmitter 300 on the basis of the control signal received from the wave-transmission control unit 50, a sound field to be avoided by the fish 510*a* is formed in the right front region of the transmitter 300.

Since the sound field of the repellent sound 312*a* for the fish 510*a* is formed in the right front region of the transmitter 300, the fish 510*a* move as indicated by an arrow B while avoiding the sound field of the repellent sound 312*a*.

On the other hand, the repellent sound 312*a* is different from the audible sound of the fish 510*b* or from the repellent sound 312*b* of the fish 510*b*. Therefore, the fish 510*b* do not move.

Figure 15:
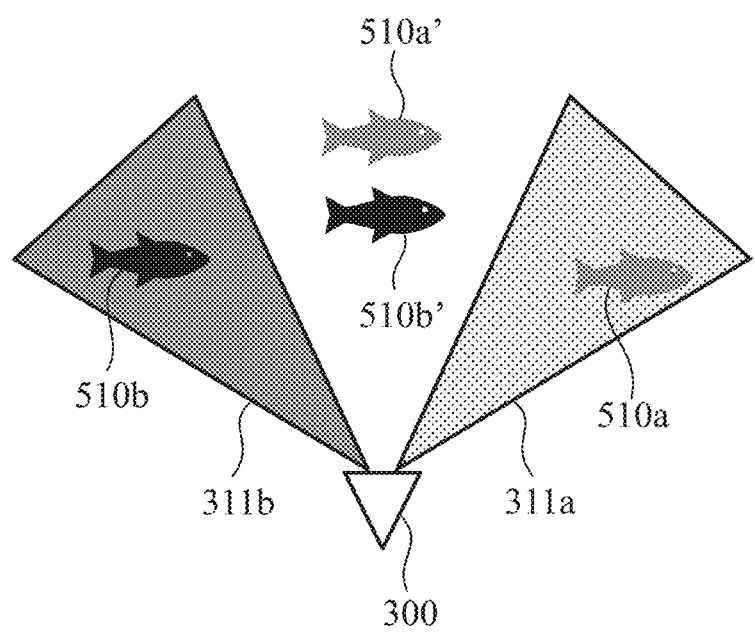
FIG. 15 is a third concept diagram illustrating the state where underwater organisms are guided by the transmitter controlled by the wave transmission control device transmitting waves.

FIG. 15 is a third concept diagram illustrating the state where underwater organisms are guided by the transmitter 300 controlled by the wave transmission control device 2 transmitting waves.

Figure 16:
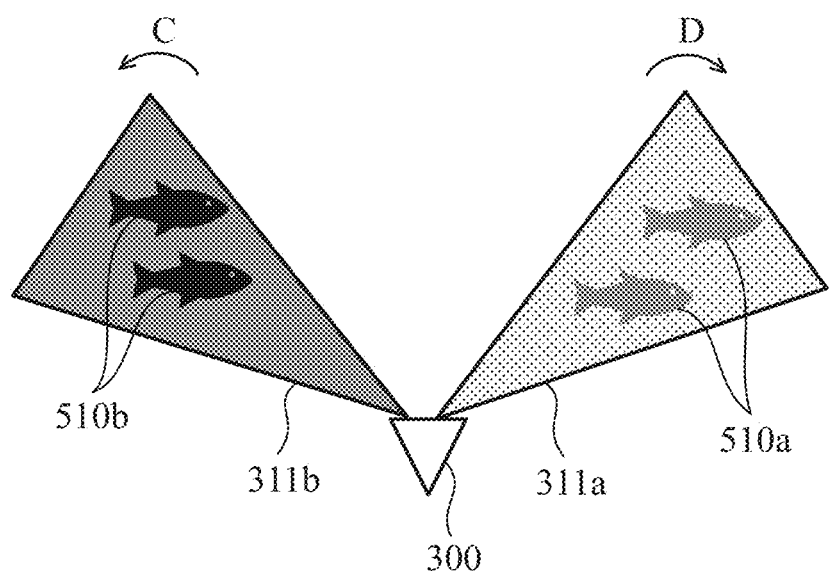
FIG. 16 is a fourth concept diagram illustrating the state where underwater organisms are guided by the transmitter controlled by the wave transmission control device transmitting waves.

FIG. 16 is a fourth concept diagram illustrating the state where underwater organisms are guided by the transmitter 300 controlled by the wave transmission control device 2 transmitting waves.

It is assumed that the setting storage unit 10 stores the set distribution information 13 indicating a distribution state where the fish 510*a* gather in the region 13*a* illustrated in FIG. 3 on the right front of the transmitter 300, and stores the set distribution information 13 indicating a distribution state where the fish 510*b* gather in the region 13*b* illustrated in FIG. 3.

By the transmitter outputting the preference sound 311*a* to the right front region of the transmitter on the basis of the control signal received from the wave-transmission control unit 50, a sound field where the fish 510*a* are guided is formed in the right front region of the transmitter 300. In addition, by the transmitter 300 outputting the preference sound 311*b* to the left front region of the transmitter 300, a sound field where the fish 510*b* are guided is formed in the left front region of the transmitter 300.

As a result, the fish 510*a* move to the right front region of the transmitter 300, whereas the fish 510*b* move to the left front region of the transmitter.

However, in single wave transmission control, as illustrated in FIG. 15, some fish 510*a*' and some fish 510*b*' may not move.

On the other hand, as in the flowchart illustrated in FIG. 10, by repeating the wave transmission control, the direction and range in which the sound field is formed in water are changed, and as indicated by arrows C and D in FIG. 16, some of the fish 510*a* and some of the fish 510*b* can also be moved in such a manner that the distribution state indicated by the set distribution information 13 is obtained.

Note that, in the above description, the wave transmission control device 2 moves fish in a horizontal direction with respect to the transmitter 300 based on the sound output direction, but it is not limited thereto, and the wave trans-mission control device may control the output intensity of the sound in the transmitter 300 on the basis of the distance to the fish and move the fish in a distance direction from the transmitter 300 to the fish. Furthermore, the wave transmis-sion control device 2 may control both the sound output direction and the sound output intensity.

As described above, the wave transmission control device according to the present disclosure controls a transmitter to form a sound field in water, the wave transmission control device including a determination unit to, when detection information is input from a sensor unit to detect an organism in water, perform determination of a characteristic of the organism among a plurality of characteristics and a distri-bution state for every characteristic using the detection information, a sound selection unit to acquire sound infor-mation based on a characteristic determined by the deter-mination unit by referring to a database in which the plurality of characteristics and a plural pieces of sound information are respectively associated with each other, and a wave-transmission control unit to determine a sound output condition in such a manner that a distribution state changes from the distribution state determined by the determination unit to a set distribution state which is set for each of the plurality of characteristics received before processing starts and to cause the transmitter to output a sound based on the sound information acquired by the sound selection unit using the sound output condition.

As a result, it has the effect of providing a wave trans-mission control device that sorts and guides underwater organisms based on each characteristic.

Furthermore, in the wave transmission control device according to the present disclosure, the wave-transmission control unit includes the distribution estimation unit to estimate an estimated distribution state where the distribu-tion state determined by the determination unit becomes closer to the set distribution state by comparing the distri-bution state determined by the determination unit with the set distribution state, and the output-condition determination unit to determine a sound output condition so as to obtain the estimated distribution state estimated by the distribution estimation unit.

As a result, it has the effect of providing a wave trans-mission control device that guides underwater organisms in a stepwise manner.

Furthermore, in the wave transmission control device according to the present disclosure, the wave-transmission control unit repeats processing of determining the sound output condition and causing the transmitter to output a sound based on the sound information acquired by the sound selection unit using the sound output condition until the distribution state determined by the determination unit changes to the set distribution state.

As a result, it is possible to provide a wave transmission control device that reliably guides underwater organisms.

Furthermore, in the wave transmission control device according to the present disclosure, the characteristic of the organism includes a type of the organism.

As a result, it is possible to provide the wave transmission control device that sorts and guides underwater organisms based on each characteristic.

Furthermore, in the wave transmission control device according to the present disclosure, the characteristic of the organism includes a size of the organism.

As a result, it is possible to provide a wave transmission control device that sorts and guides underwater organisms based on the size of the underwater organisms.

Furthermore, in the wave transmission control device according to the present disclosure, the characteristic of the organism includes a type of the organism and a size of the organism.

As a result, it is possible to provide a wave transmission control device that sorts and guides underwater organisms based on each combination of the type and size of the underwater organisms.

Furthermore, in the wave transmission control device according to the present disclosure, the wave-transmission control unit causes the transmitter to output a preference sound preferred by the organism.

As a result, it is possible to provide a wave transmission control device that guides underwater organisms so as to attract the underwater organisms using different preference sounds based on each characteristic.

Furthermore, in the wave transmission control device according to the present disclosure, the wave-transmission control unit causes the transmitter to output a repellent sound of an organism.

As a result, it is possible to provide a wave transmission control device that guides underwater organisms so as to move away using different repellent sounds based on each characteristic.

Furthermore, in the wave transmission control device according to the present disclosure, in a case where the transmitter can output different sounds in a plurality of output directions respectively, the wave-transmission control unit causes the transmitter to output a preference sound preferred by the organism and a repellent sound of the organism as the different sounds.

As a result, since the preference sound and the repellent sound are used in combination for each characteristic of underwater organisms, it has the effect of providing a wave transmission control device that more easily sorts and guides the underwater organisms.

The underwater organism guidance device according to the present disclosure includes a transmitter to form a sound field in water, the determination unit to, when detection information is input from a sensor unit to detect an organism in water, perform determination of a characteristic of the organism among a plurality of characteristics and a distribution state for the characteristics using the detection information, the sound selection unit to acquire sound information based on a characteristic determined by the determination unit using a database in which a plural pieces of information of the plurality of characteristics of organisms and a plural pieces of sound information are respectively associated with each other, and the wave-transmission control unit to determine a sound output condition in such a manner that a distribution state changes from the distribution state determined by the determination unit to a set distribution state which is set for each of the plurality of characteristics received before processing starts and to cause the transmitter to output a sound based on sound information acquired by the sound selection unit using the sound output condition.

As a result, it has the effect of providing an underwater organism guidance device that sorts and guides underwater organisms based on each characteristic.

Furthermore, in the underwater organism guidance device according to the present disclosure, the wave-transmission control unit includes the distribution estimation unit to estimate an estimated distribution state where the distribution state determined by the determination unit becomes closer to the set distribution state by comparing the distribution state determined by the determination unit with the set distribution state, and an output-condition determination unit to determine a sound output condition so as to obtain the estimated distribution state estimated by the distribution estimation unit.

As a result, it has the effect of providing an underwater organism guidance device that guides underwater organisms in a stepwise manner. As a result, the underwater organism guidance device easily guides underwater organisms.

Furthermore, in the underwater organism guidance device according to the present disclosure, the wave-transmission control unit repeats processing of determining the sound output condition and causing the transmitter to output a sound based on sound information acquired by the sound selection unit using the output condition until the distribution state determined by the determination unit changes to the set distribution state.

As a result, it has the effect of providing an underwater organism guidance device that reliably guides underwater organisms.

In the underwater organism guidance device according to the present disclosure, the transmitter includes an underwater speaker.

As a result, it has the effect of providing the underwater organism guidance device that sorts and guides underwater organisms based on each characteristic.

In the underwater organism guidance device according to the present disclosure, the transmitter includes a superdirectional speaker.

As a result, it has the effect of providing the underwater organism guidance device that sorts and guides underwater organisms based on each characteristic.

In the underwater organism guidance device according to the present disclosure, the transmitter includes a speaker array.

As a result, it has the effect of providing the underwater organism guidance device that sorts and guides underwater organisms based on each characteristic.

In the underwater organism guidance device according to the present disclosure, the transmitter includes a drive unit to change a direction in which the transmitter transmits a wave in accordance with the sound output condition determined by the wave-transmission control unit.

As a result, it has the effect of providing an underwater organism guidance device that, in water where the transmitter can transmit waves, can cause the transmitter to form a sound field in any direction in water and in any range in water.

The wave transmission control method according to the present disclosure is a method to control a transmitter to form a sound field in water, the wave transmission control method including a determination step to, when detection information is input from a sensor unit to detect an organism in water, cause a determination unit to perform determination of a characteristic of the organism among a plurality of characteristics and a distribution state for every characteristic using the detection information, a sound acquisition step to cause a sound selection unit to acquire sound information based on the characteristic determined by the determination unit using a database in which a plural pieces of information of the plurality of characteristics of organisms and a plural pieces of sound information are respectively associated with each other, and a wave-transmission control step to cause a wave-transmission control unit to determine a sound output condition in such a manner that a distribution state changes from the distribution state determined by the determination unit to a set distribution state which is set for each of the plurality of characteristics received before processing starts and to cause the transmitter to output a sound based on sound information acquired by the sound selection unit using the output condition.

As a result, it has the effect of providing a wave transmission control method that sorts and guides underwater organisms based on each characteristic.

Note that it is possible to modify or omit any component of the embodiment within the scope of the present disclosure.

INDUSTRIAL APPLICABILITY

The wave transmission control device according to the present disclosure can select a sound for each characteristic of an underwater organism, output the sound so as to satisfy an output condition for obtaining a distribution state for each characteristic, and sort and guide the underwater organism based on each characteristic, and thus is suitable for use in an underwater organism guidance device.

REFERENCE SIGNS LIST

1: underwater organism guidance device, 2: wave transmission control device, 10: setting storage unit, 11: identification information (set identification information), 12: characteristic information (set characteristic information), 13: distribution information (set distribution information), 13*a*, 13*b*: region, 20: determination unit, 21: characteristic determination unit, 22: distribution determination unit, 23: guidance determination unit, 30: sound selection unit, 50: wave-transmission control unit, 51: distribution estimation unit, 52: output-direction determination unit (an example of an output-condition determination unit of the present disclosure), 53: control-signal generation unit, 100: sensor unit, 200: sound information database. 201: identification information, 202: characteristic information, 203: sound information, 300: transmitter, 311*a*. 311*b*: preference sound, 312*a*, 312*b*: repellent sound, 510*a*, 510*a'*, 510*b*, 510*b'*: underwater organism, 1001: processing circuit, 1002: HDD, 1003: input interface device, 1004: output interface device, 1005: CPU, 1006: memory, 1007: HDD

The invention claimed is:

1. A wave transmission control device to perform control of a transmitter to form a sound field in water, the wave transmission control device comprising processing circuitry to, when detection information is input from a sensor to detect an organism in water, perform determination of a characteristic of the organism among a plurality of characteristics, and a distribution state of a location of the organism in the water with respect to a position of the transmitter for each characteristic among the plurality of characteristics, using the detection information, to acquire sound information based on the characteristic by referring to a database in which the plurality of characteristics and a plural pieces of sound information are respectively associated with each other, and to determine a sound output condition in such a manner that a distribution state changes from the distribution state to a set distribution state which is set for each of the plurality of characteristics received before processing starts and to cause the transmitter to output a sound based on the sound information using the sound output condition.

2. The wave transmission control device according to claim 1, wherein the processing circuitry further performs to estimate an estimated distribution state where the distribution state becomes closer to the set distribution state by comparing the distribution state with the set distribution state; and to determine a sound output condition so as to obtain the estimated distribution state.

3. The wave transmission control device according to claim 2, wherein the repeats processing of determining the sound output condition and causing the transmitter to output a sound based on the sound information using the sound output condition until the distribution state changes to the set distribution state.

4. The wave transmission control device according to claim 1, wherein the characteristic of the organism includes a type of the organism.

5. The wave transmission control device according to claim 1, wherein the characteristic of the organism includes a size of the organism.

6. The wave transmission control device according to claim 1, wherein the characteristic of the organism includes a type of the organism and a size of the organism.

7. The wave transmission control device according to claim 1, wherein the processing circuitry causes the transmitter to output a preference sound preferred by the organism.

8. The wave transmission control device according to claim 1, wherein the processing circuitry causes the transmitter to output a repellent sound of an organism.

9. The wave transmission control device according to claim 1, wherein in a case where the transmitter can output different sounds in a plurality of output directions respectively, the processing circuitry causes the transmitter to output a preference sound preferred by the organism and a repellent sound of the organism as the different sounds.

10. An underwater organism guidance device comprising:

a transmitter to form a sound field in water;

processing circuitry to, when detection information is input from a sensor to detect an organism in water, perform determination of a characteristic of the organism among a plurality of characteristics, and a distribution state of a location of the organism in the water with respect to a position of the transmitter for each characteristic among the plurality of characteristics, using the detection information, to acquire sound information based on the characteristic using a database in which a plural pieces of information of the plurality of characteristics of organisms and a plural pieces of sound information are respectively associated with each other, and to determine a sound output condition in such a manner that a distribution state changes from the distribution state to a set distribution state which is set for each of the plurality of characteristics received before processing starts and to cause the transmitter to output a sound based on the sound information using the sound output condition.

11. The underwater organism guidance device according to claim 10, wherein the processing circuitry further performs to estimate an estimated distribution state where the distribution state becomes closer to the set distribution state by comparing the distribution state with the set distribution state, and to determine a sound output condition so as to obtain the estimated distribution state.

12. The underwater organism guidance device according to claim 11, wherein the processing circuitry repeats processing of determining the sound output condition and causing the transmitter to output a sound based on sound information using the sound output condition until the distribution state changes to the set distribution state.

13. The underwater organism guidance device according to claim 10, wherein the transmitter includes an underwater speaker.

14. The underwater organism guidance device according to claim 10, wherein the transmitter includes a superdirectional speaker.

15. The underwater organism guidance device according to claim 10, wherein the transmitter includes a speaker array.

16. The underwater organism guidance device according to claim 10, wherein the transmitter includes a driver to change a direction in which the transmitter transmits a wave in accordance with the sound output condition.

17. A wave transmission control method to control a transmitter to form a sound field in water, the wave transmission control method comprising:

when detection information is input from a sensor to detect an organism in water, causing processing circuitry to perform determination of a characteristic of the organism among a plurality of characteristics, and a distribution state of a location of the organism in the water with respect to a position of the transmitter for each characteristic among the plurality of characteristics, using the detection information;

causing the processing circuitry to acquire sound information based on the characteristic using a database in which a plural pieces of information of the plurality of characteristics of organisms and a plural pieces of sound information are respectively associated with each other; and causing the processing circuitry to determine a sound output condition in such a manner that a distribution state changes from the distribution state to a set distribution state which is set for each of the plurality of characteristics received before processing starts and causing the transmitter to output a sound based on the sound information using the sound output condition.

\*  \*  \*  \*  \*